United States Patent [19]

Kudo

[11] Patent Number: 4,792,216
[45] Date of Patent: Dec. 20, 1988

[54] PHOTOGRAPHIC LENS SYSTEM
[75] Inventor: Yoshinobu Kudo, Osaka, Japan
[73] Assignee: Minolta Camera Kabushiki Kaisha, Osaka, Japan
[21] Appl. No.: 748,500
[22] Filed: Jun. 25, 1985
[30] Foreign Application Priority Data Jul. 2, 1984 [JP] Japan .................. 59-137569

[51] Int. Cl.$^4$ .............................. G02B 9/34
[52] U.S. Cl. ....................... 350/432; 350/469
[58] Field of Search ................. 350/469, 432

Primary Examiner—John K. Corbin
Assistant Examiner—P. M. Dzierzynski
Attorney, Agent, or Firm—Price, Gess & Ubell

[57] ABSTRACT

A compact photographic lens system of 4-components in which only the image side surface of the fourth lens component, numbered from the object side, is aspheric and whose radius of curvature decreases in accordance with the increase of the height from the optical axis, and fulfills the following conditions:

$0.22 < f_3/f_{12} < 0.29$ $1.10f < -f_4 < 1.35f$ $0.71f < r_4 < 0.90f$ $1.0f < -r_6 < 1.35f$ $0.088f < d_1 < 0.11f$ $0.033f < d_3 < 0.050f$ $1.68 < Nd_1 < 1.75$ $1.78 < Nd_3 < 1.81.$

6 Claims, 4 Drawing Sheets

F No. 2.88

Spherical Aberration
Sine Condition

——— d
---- SC

32° W

Astigmatism

---- DM
——— DS

32° W

Dislortion(%)

Spherical Aberration
Sine Condition

Astigmatism

Dislortion (%)

FIG. 7
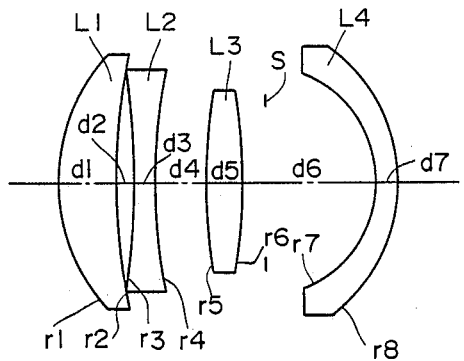
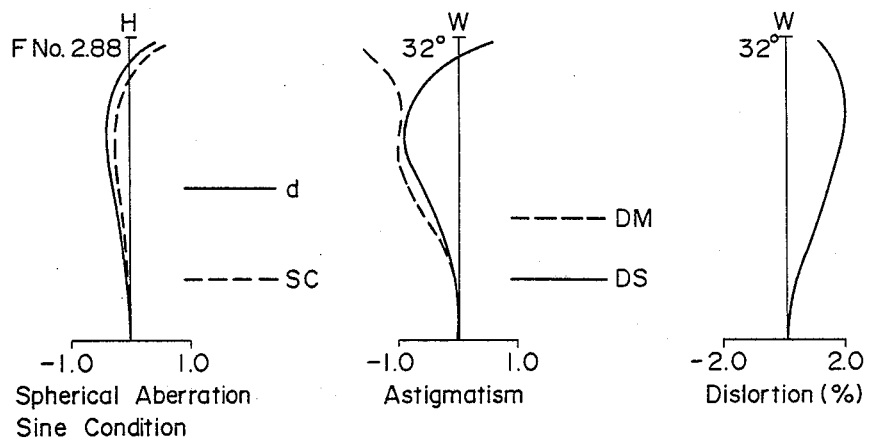
FIG. 8a  FIG. 8b  FIG. 8c
Spherical Aberration
Sine Condition
Astigmatism
Distortion (%)

PHOTOGRAPHIC LENS SYSTEM

BACKGROUND OF THE INVENTION

1. Field of the Invention

The present invention relates to a photographic lens system, and more particularly to a four-component photographic lens system.

2. Description of the Prior Art

A component photographic lens system is recently desired for making the entire of camera system compact. It is well known in order to make the photographic lens system, that a telephoto type of design can be applied. The telephoto type lens system comprises from the object side to the image side, a front lens group having a positive refractive power and a rear lens group having a negative refractive power. Such a telephoto type of lens is effective for shortening the total length of the lens system. However, the telephoto type lens system is applicable to a telephoto lens system having a relating small angle of view. Thus, it is extremely difficult to design a telephoto type photographic lens system having an optical performance in which the angle of view is over 60 degrees and the telephoto ratio is less than 1.0, while obtaining a sufficient light amount in the marginal area and having good compensation of various aberrations.

SUMMARY OF THE INVENTION

An object of the present invention is to provide a telephoto type photographic lens system in which the optical performance of the angle of view over 60 degrees and of the telephoto ratio less than 1.0, is satisfied with having a good compensation of aberrations, and in which the light amount in the marginal area is sufficient.

The other object of the present invention is to provide the telephoto type photographic lens system described above in which the construction is more compact.

To achieve the above objects, according to the present invention, a photographic lens system comprises from the object side to the image side, a first lens component of a positive meniscus lens element convex to the object side, a second lens component of a bi-concave lens element, a third lens component of a bi-convex lens element, and a fourth lens component of a negative meniscus lens element concave to the object side, wherein the object side surface of the fourth lens component is aspheric and whose radius of curvature decreases in accordance with the increase of the height from the optical axis of the lens system, while all of the other surfaces excepting for the object side surface of the fourth lens component are spheric, and wherein the lens system fulfills the following conditions:

$$0.22 < f_3/f_{12} < 0.29$$

$$1.10f < -f_4 < 1.35f$$

$$0.71f < r_4 < 0.90f$$

$$1.0f < -r_6 < 1.35f$$

$$0.088f < d_1 < 0.11f$$

$$0.033f < d_3 < 0.050f$$

$$1.68f < Nd_1 < 1.75$$

$$1.78 < Nd_3 < 1.81$$

wherein, $f_3$ represents the focal length of the third lens component, $f_{12}$ represents the compound focal length of the first and second lens components, $f_4$ represents the focal length of the fourth lens component, $r_4$ represents the radius of curvature of the image side surface of the second lens component, $r_6$ represents the radius of curvature of the image side surface of the third lens component, $d_1$ represents the axial thickness of the first lens component, $d_3$ represents the axial thickness of the third lens component, $Nd_1$ represents the refractive index of the first lens component, $Nd_3$ represents the refractive index of the third lens component, and f represent the focal length of the whole lens system.

BRIEF DESCRIPTION OF THE DRAWINGS

FIG. 7 represents a cross sectional view of the lens system according to a fourth embodiment of the present invention; and FIGS. 8a to 8c represent the aberration curves of the fourth embodiment.

DETAILED DESCRIPTION OF THE PREFERRED EMBODIMENTS

Figure 1:
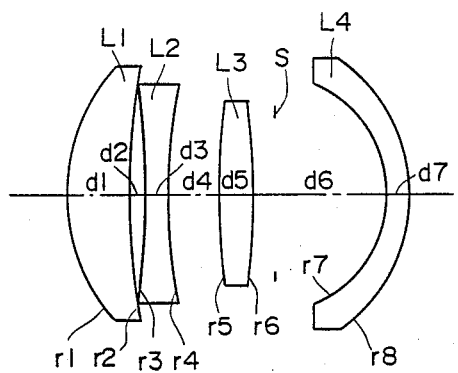
FIG. 1 represents a cross sectional view of the lens system according to a first embodiment of the present invention.
Figure 2A:
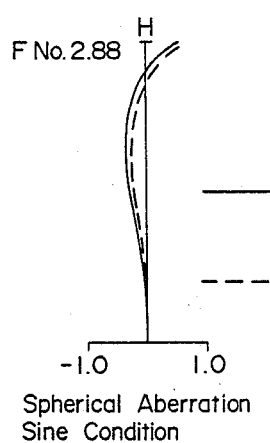
FIGS. 2a to 2c represent the aberration curves of the first embodiment.
Figure 2B:
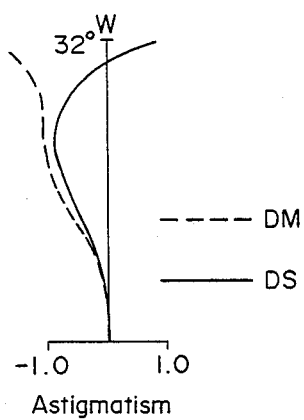
Figure 2C:
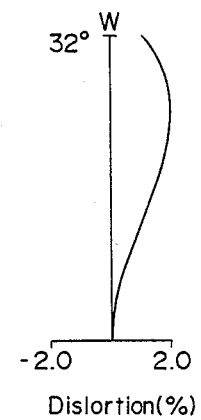

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens-shutter camera.

In the drawings, schematic cross sectional views disclose the position of lens elements. Due to the number of lens elements involved, it was not deemed appropriate to include individual designation of the radii of curvature and axial distance for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 3:
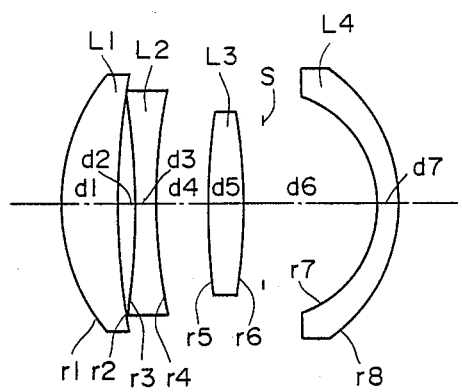
FIG. 3 represents a cross sectional view of the lens system according to a second embodiment of the present invention.
Figure 4A:
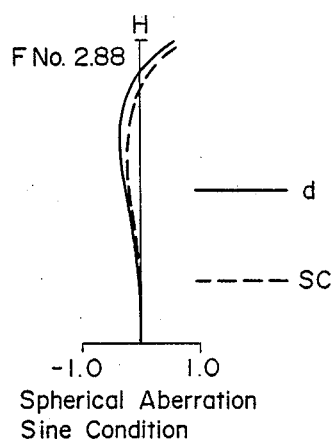
FIGS. 4a to 4c represent the aberration curves of the second embodiment.
Figure 4B:
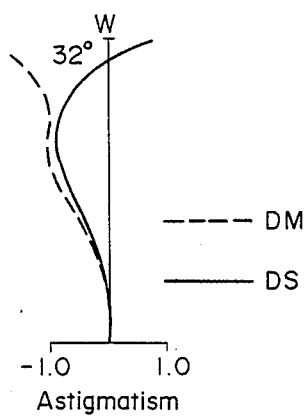
Figure 4C:
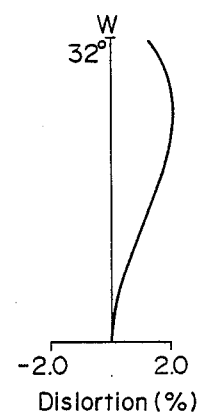
Figure 5:
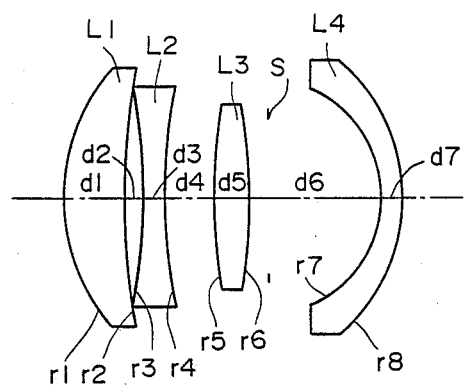
FIG. 5 represents a cross sectional view of the lens system according to a third embodiment of the present invention.
Figures 6A, 6B, 6C:
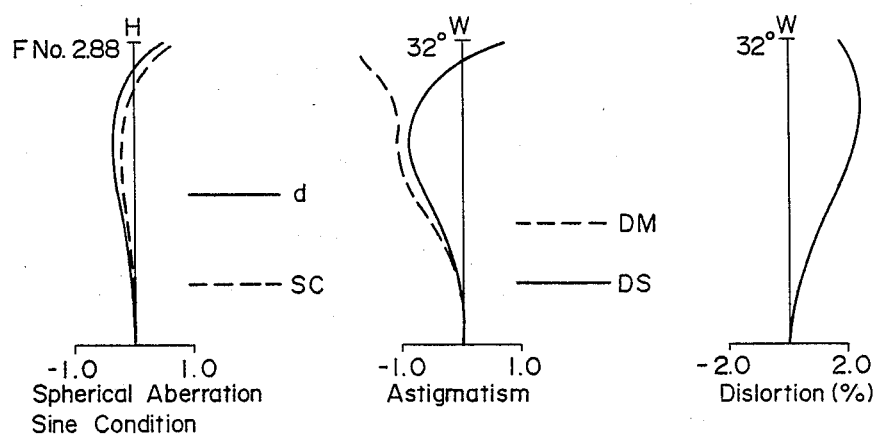
FIGS. 6a to 6c represent the aberration curves of the embodiment.

As shown in FIGS. 1, 3, 5 and 7, the present invention provides a photographic lens system comprising from the object side to the image side, a first lens component ($L_1$) of a positive meniscus lens element convex to the object side, a second lens component ($L_2$) of a bi-concave lens element, a third lens component ($L_3$) of a bi-convex lens element, and a fourth lens component ($L_4$) of a negative meniscus lens element concave to the object side, wherein the object side surface ($r_7$) of the fourth lens component ($L_4$) is aspheric and whose radius of curvature decreases in accordance with the increase of the height from the optical axis of the lens system, while all of the other surfaces ($r_1$) ($r_2$) ($r_3$) ($r_4$) ($r_5$) ($r_6$) and ($r_8$) excepting for the object side surface ($r_7$) of the fourth lens component ($L_4$) are spheric, and wherein the lens system fulfills the following conditions:

$$0.22 < f_3/f_{12} < 0.29 \quad (1)$$

$$1.10f < -f_4 < 1.35f \quad (2)$$

$$0.71f < r_4 < 0.90f \quad (3)$$

$$1.0f < -r_6 < 1.35f \quad (4)$$

$$0.088f < d_1 < 0.11f \quad (5)$$

$$0.033f < d_3 < 0.050f \quad (6)$$

$$1.68f < Nd_1 < 1.75 \quad (7)$$

$$1.78 < Nd_3 < 1.81 \quad (8)$$

wherein, $f_3$ represents the focal length of the third lens component ($L_3$), $f_{12}$ represents the compound focal length of the first and second lens components ($L_1$) and ($L_2$), $f_4$ represents the focal length of the fourth lens component ($L_4$), $r_4$ represents the radius of curvature of the image side surface ($r_4$) of the second lens component ($L_2$), $r_6$ represents the radius of curvature of the image side surface ($r_6$) of the third lens component ($L_3$), $d_1$ represents the axial thickness of the first lens component ($L_1$), $d_3$ represents the axial thickness of the third lens component ($L_3$), $Nd_1$ represents the refractive index of the first lens component ($L_1$), $Nd_3$ represents the refractive index of the third lens component ($L_3$) and f represent the focal length of the whole lens system.

A telephoto type lens system is effective for shortening the total length of the whole lens system. However, in such a type of lens system, positive distortion is increased in accordance with a decreasing of the telephoto ratio, especially for a relatively wide angle of view. Furthermore, the light amount in the marginal area becomes insufficient in accordance with widening of the angle of view.

Therefore, according to the present invention, it is for compensating the aberrations and for obtaining a sufficient light amount in the marginal area to make the front lens group of the telephoto type which consists of the first to third lens components ($L_1$) to ($L_3$) compact as possible, and to apply a negative meniscus lens element concave to the object side to the rear lens group of the telephoto type, that is, to the fourth lens component ($L_4$).

Condition (1) defines the balance of power among the first to third lens components ($L_1$) to ($L_3$) for compensating the aberrations. If the upper limit of condition (1) is violated, it becomes difficult to compensate the distortion, and the field curvature is in an undercorrected condition. If the lower limit of condition (1) is violated, it is impossible to sufficiently decrease the Petzval sum of the lens system.

Conditions (5) and (6) are effective for making the first to third lens components ($L_1$) to ($L_3$) compact, and for compensating the distortion. Although the positive distortion is essentially increased to widen the angle of view in the telephoto type lens system, such distortion is controlled by compensating the positive distortion generated in the first lens component ($L_1$) by the second lens component ($L_2$) in the present invention. If the upper limit of one of the conditions (5) and (6) is violated, since the off-axial light rays are incident on the second lens component ($L_2$) near the optical axis of the lens system, the compensation for the distortion becomes insufficient, and the light amount in the marginal area becomes insufficient because of the deterioration of the compactness. On the other hand, if the lower limit of one of the conditions (5) and (6) is violated, the thickness of the first lens component ($L_1$) necessary for holding it becomes insufficient, or it becomes difficult to manufacturing the second lens component ($L_2$), though it is desirable for compensating the distortion and for obtaining a sufficient light amount in the marginal area.

Condition (2) limits the focal length of the fourth lens component ($L_4$) in relation to the focal length of the whole lens system. If the upper limit of condition (2) is violated, it becomes difficult to make the total length of the lens system compact since the refractive power of the fourth lens component ($L_4$) becomes too weak, and the field curvature can not be compensated well since it is difficult to decrease the Petzval sum. If the lower limit of condition (2) is violated, though it is effective for making the total length of the lens system compact because of an increase in the refractive power of the fourth lens component ($L_4$), it becomes difficult to compensating the aberrations in the paraxial area and in off-axial area while maintaining good balance. Furthermore, if the fourth lens component ($L_4$) is made of a synthetic resin material, the change of the back focal length of the lens system due to the change of the temperature can be increased. Additionally, errors due to the parallel shift of at least one element in manufacturing the lens system are increased in this telephoto type lens system.

Conditions (7) and (8) relate to compensation of both of the field curvature and the spherical aberration. If the upper limit of one of conditions (7) and (8) is violated, the spherical aberration becomes over corrected and the field curvature is deteriorated because of the decrease of the Petzval sum. If the lower limit of one of conditions (7) and (8) is violated, the spherical aberration becomes under corrected and it becomes difficult to properly correct the field curvature because of the increase of the Petzval sum.

Conditions (3) and (4) also relate to compensation of the field curvature and the spherical aberration. If the upper limit of one of the conditions (3) and (4) is violated, the spherical aberration becomes under-corrected, the field curvature, especially in the meridional plane, is substantially over-corrected, and it becomes difficult to correct the distortion properly because of the considerably large value of the positive distortion. If the lower limit of one of the conditions (3) and (4), the spherical aberration is over corrected, and the field curvature in the meridional plane is under-corrected.

Furthermore, the coma is increased remarkably in a relatively low angle of view.

Furthermore, according to the present invention, an aspheric surface is applied only to the image side surface ($r_8$) of the fourth lens element ($L_4$), that is, to the last surface of the lens system, for maintaining the sufficient light amount in the marginal area and for compensating the aberrations in the off-axial area. The configuration of such an aspheric surface is limited so as to decrease the radius of curvature thereof in accordance with the increase of the height from the optical axis. The reason for applying an aspheric surface only to the last surface of the lens system, is to compensate the aberations in the off-axial area, especially for the distortion therein, while being capable of manufacturing the lens system without difficulty, by means of applying an aspheric surface only to the surface which is the most effective for compensating the aberrations in the off-axial area.

According to the present invention, it is desirable to satisfy the following conditions:

$$r_5 = |r_6| \quad (9)$$

$$1.0f < -r_6 < 1.28f \quad (10)$$

wherein, $r_5$ represents the radius of curvature of the object side surface ($r_5$) of the third lens component ($L_3$).

Condition (9) defines that the curvature of the object side surface ($r_5$) of the third lens component ($L_3$) is the same as the curvature of the image side surface ($r_6$) thereof. This condition (9) is effective for constructing the lens system easily, because a troublesome step for distinguishing whether the surface should be located at the object side in the third lens component ($L_3$), is excluded.

Condition (10) relates to further compensating the field curvature and the spherical aberration. If the condition (10) is satisfied, the spherical aberration, the field curvature and the distortion are further corrected properly.

In FIGS. 1, 3, 5 and 7, S represents the aperture stop.

The following Tables 1 to 4 disclose, respectively, the first through fourth embodiments of the present invention. In the Tables, f equals the focal length, $F_{No.}$ equals the F-number, 2w equals the angle of view, L equals the telephoto ratio, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, v equals the Abbe number and the sub numbers refer to the specific lens elements from the object to image side. The asterisk (*) represent the aspheric surface, and its coefficients are shown at the bottom of respective Tables.

Here, the aspheric coefficients a, b, c, d, e, f and g are defined by the following equation:

$$X = \frac{Y^2}{r_i + r_i\sqrt{1-(Y/r_i)^2}} + aY^2 + bY^4 + cY^6 + dY^8 + \ldots$$

wherein, $r_i$ represents the paraxial radius of curvature, of the basic spheric surface, X represents the coordinate along the optical surface measured from the top of the basic surface, and Y represents the coordinate perpendicular to the optical axis measured from the optical axis.

TABLE 1

[Embodiment 1]
$f = 100 \quad F_{No.} = 2.88 \quad 2w = 64° \quad L = 0.99$

| radius of curvature | axial distance | refractive index | Abbe number |
|---|---|---|---|
| $r_1$ 32.77 | | | |
| | $d_1$ 9.81 | $Nd_1$ 1.71300 | $vd_1$ 53.93 |
| $r_2$ 107.72 | | | |
| | $d_2$ 2.35 | | |
| $r_3$ −160.43 | | | |
| | $d_3$ 4.00 | $Nd_2$ 1.80518 | $vd_2$ 25.43 |
| $r_4$ 80.97 | | | |
| | $d_4$ 8.64 | | |
| $r_5$ 118.25 | | | |
| | $d_5$ 5.60 | $Nd_3$ 1.80500 | $vd_3$ 40.97 |
| $r_6$ −118.25 | | | |
| | $d_6$ 22.37 | | |
| $r_7$ −19.13 | | | |
| | $d_7$ 3.50 | $Nd_4$ 1.49140 | $vd_4$ 57.82 |
| $r_8^*$ −29.74 | | | |

$a = 0.0$
$b = 0.3458 \times 10^{-7}$
$c = -0.1626 \times 10^{-7}$
$d = 0.6396 \times 10^{-10}$
$e = -0.1981 \times 10^{-12}$
$f = 0.3079 \times 10^{-15}$
$g = -0.2394 \times 10^{-18}$ $f3/f12 = 0.27$
$-f4 = 122.4$

TABLE 2

[Embodiment 2]
$f = 100 \quad F_{No.} = 2.88 \quad 2w = 64° \quad L = 0.99$

| radius of curvature | axial distance | refractive index | Abbe number |
|---|---|---|---|
| $r_1$ 32.69 | | | |
| | $d_1$ 9.51 | $Nd_1$ 1.71300 | $vd_1$ 53.93 |
| $r_2$ 110.57 | | | |
| | $d_2$ 2.40 | | |
| $r_3$ −168.71 | | | |
| | $d_3$ 3.61 | $Nd_2$ 1.80518 | $vd_2$ 25.43 |
| $r_4$ 78.75 | | | |
| | $d_4$ 8.97 | | |
| $r_5$ 120.47 | | | |
| | $d_5$ 5.59 | $Nd_3$ 1.80500 | $vd_3$ 40.97 |
| $r_6$ −120.47 | | | |
| | $d_6$ 22.37 | | |
| $r_7$ −19.23 | | | |
| | $d_7$ 3.45 | $Nd_4$ 1.49140 | $vd_4$ 57.82 |
| $r_8^*$ −29.65 | | | |

$a = 0.0$
$b = 0.6556 \times 10^{-6}$
$c = -0.2026 \times 10^{-7}$
$d = 0.8258 \times 10^{-10}$
$e = -0.2415 \times 10^{-12}$
$f = 0.3585 \times 10^{-15}$
$g = -0.2596 \times 10^{-18}$ $f3/f12 = 0.29$
$-f4 = 125.0$

TABLE 3

[Embodiment 3]
$f = 100 \quad F_{No.} = 2.88 \quad 2w = 64° \quad L = 0.99$

| radius of curvature | axial distance | refractive index | Abbe number |
|---|---|---|---|
| $r_1$ 32.77 | | | |
| | $d_l$ 10.01 | $Nd_1$ 1.69680 | $vd_1$ 56.47 |
| $r_2$ 105.74 | | | |
| | $d_2$ 2.55 | | |
| $r_3$ −142.22 | | | |
| | $d_3$ 4.21 | $Nd_2$ 1.80518 | $vd_2$ 25.43 |
| $r_4$ 86.34 | | | |
| | $d_4$ 8.22 | | |
| $r_5$ 112.71 | | | |
| | $d_5$ 5.58 | $Nd_3$ 1.80500 | $vd_3$ 40.97 |
| $r_6$ −112.71 | | | |

TABLE 3-continued

[Embodiment 3]
f = 100   $F_{No.}$ = 2.88   2w = 64°   L = 0.99

| | | | |
|---|---|---|---|
| | $d_6$ 22.31 | | |
| $r_7$ −19.52 | | | |
| | $d_7$ 3.48 | $Nd_4$ 1.49140 | $\nu d_4$ 57.82 |
| $r_8$* −31.04 | | | | a = 0.0
b = 0.9344 × $10^{-6}$
c = −0.2120 × $10^{-7}$
d = 0.9165 × $10^{-10}$
e = −0.2625 × $10^{-12}$
f = 0.3763 × $10^{-15}$
g = −0.2419 × $10^{-18}$ $f_3/f_{12}$ = 0.23
−$f_4$ = 118.9

TABLE 4

[Embodiment 4]
f = 100   $F_{No.}$ = 2.88   2w = 64°   L = 0.99

| radius of curvature | axial distance | refractive index | Abbe number |
|---|---|---|---|
| $r_1$ 32.70 | | | |
| | $d_1$ 9.53 | $Nd_1$ 1.71300 | $\nu d_1$ 53.93 |
| $r_2$ 109.57 | | | |
| | $d_2$ 2.41 | | |
| $r_3$ −166.82 | | | |
| | $d_3$ 3.60 | $Nd_2$ 1.80518 | $\nu d_2$ 25.43 |
| $r_4$ 78.48 | | | |
| | $d_4$ 8.98 | | |
| $r_5$ 119.19 | | | |
| | $d_5$ 5.61 | $Nd_3$ 1.80500 | $\nu d_3$ 40.97 |
| $r_6$ −119.19 | | | |
| | $d_6$ 22.46 | | |
| $r_7$ −19.24 | | | |
| | $d_7$ 3.46 | $Nd_4$ 1.49140 | $\nu d_4$ 57.82 |
| $r_8$* −29.64 | | | | a = 0.0
b = 0.5290 × $10^{-6}$
c = −0.2011 × $10^{-7}$
d = 0.8153 × $10^{-10}$
e = −0.2368 × $10^{-12}$
f = 0.3507 × $10^{-15}$
g = −0.2564 × $10^{-18}$ $f_3/f_{12}$ = 0.27
−$f_4$ = 125.4

What is claimed is:

1. A photographic lens system, comprising from the object side to the image side:

a first lens component of a positive meniscus lens element convex to the object side;

a second lens component of a bi-concave lens element;

a third lens component of a bi-convex lens element; and a fourth lens component of a negative meniscus lens element concave to the object side; wherein the object side surface of the fourth lens component is aspheric and whose radius of curvature decreases in accordance with the increase of the height from the optical axis of the lens system, while all of the other surfaces excepting for the object side surface of the fourth lens component are spheric, and wherein the lens system fulfills the following conditions:

0.22 < $f_3/f_{12}$ < 0.29

1.10f < −$f_4$ < 1.35f 0.78f < $r_4$ < 0.90f 0.088f < $d_1$ < 0.11f 0.033f < $d_3$ < 0.050f 1.68 < $Nd_1$ < 1.75

1.78 < $Nd_3$ < 1.81

1.0f < −$r_6$ < 1.28f wherein, $f_3$ represents the focal length of the third lens component;

$f_{12}$ represents the compound focal length of the first and second lens components;

$f_4$ represents the focal length of the fourth lens component;

$r_4$ represents the radius of curvature of the image side surface of the second lens component;

$r_6$ represents the radius of curvature of the image side surface of the third lens component;

$d_1$ represents the axial thickness of the first lens component;

$d_3$ represent the axial thickness of the third lens component;

$Nd_1$ represents the refractive index of the first lens component;

$Nd_3$ represents the refractive index of the third lens component; and f represent the focal length of the whole lens system.

2. A photographic lens system as claimed in claim 1, wherein the fourth lens component is made of a synthetic resin material.

3. A photographic lens system comprising the following design parameters:

| f = 100   $F_{No.}$ = 2.88   2w = 64°   L = 0.99 | | | |
|---|---|---|---|
| radius of curvature | axial distance | refractive index | Abbe number |
| $r_1$ 32.70 | | | |
| | $d_1$ 9.53 | $Nd_1$ 1.71300 | $\nu d_1$ 53.93 |
| $r_2$ 109.57 | | | |
| | $d_2$ 2.41 | | |
| $r_3$ −166.82 | | | |
| | $d_3$ 3.60 | $Nd_2$ 1.80518 | $\nu d_2$ 25.43 |
| $r_4$ 78.48 | | | |
| | $d_4$ 8.98 | | |
| $r_5$ 119.19 | | | |
| | $d_5$ 5.61 | $Nd_3$ 1.80500 | $\nu d_3$ 40.97 |
| $r_6$ −119.19 | | | |
| | $d_6$ 22.46 | | |
| $r_7$ −19.24 | | | |
| | $d_7$ 3.46 | $Nd_4$ 1.49140 | $\nu d_4$ 57.82 |
| $r_8$* −29.64 | | | | a = 0.0
b = 0.5290 × $10^{-6}$
c = −0.2011 × $10^{-7}$
d = 0.8153 × $10^{-10}$
e = −0.2368 × $10^{-12}$
f = 0.3507 × $10^{-15}$
g = 0.2564 × $10^{-18}$ wherein, aspheric coefficients a, b, c, d, e, f and g are defined by the following equation;

$$X = \frac{Y^2}{r_i + r_i\sqrt{1 - (Y/r_i)^2}} + aY^2 + bY^4 + cY^6 + dY^8 + \ldots$$

wherein, $r_i$ represents the paraxial radius of curvature, of the basic spheric surface, X represents the coordinate along the optical surface measured from the top of the basic surface, and Y represents the coordinate perpendicular to the optical axis measured from the optical axis.

4. A photographic lens system, comprising from the object side to the image side:
 a first lens component of a positive meniscus lens element, convex to the object side;
 a second lens component of a bi-concave lens element;
 a third lens component of a bi-convex lens element; and
 a fourth lens component of a negative meniscus lens element, concave to the object side, wherein the object side surface of the fourth lens component is aspheric whereby its radius of curvature decreases in accordance with an increase of distance from the optical axis of the lens system, while all of the other surfaces excepting for the object side surface of the fourth lens component are spheric, and wherein the lens system fulfills the following conditions:

$1.10f < -f_4 < 1.35f$ $0.78f < r_4 < 0.90f$ $0.088f < d_1 < 0.11f$ $1.78 < Nd_3 < 1.81$ wherein,
 $f_4$ represents the focal length of the fourth lens component;
 $r_4$ represents the radius of curvature of the image side surface of the second lens component;
 $d_1$ represents the axial thickness of the first lens component;
 $Nd_3$ represents the refractive index of the third lens component; and
 f represents the focal length of the whole lens system.

5. A photographic lens system, comprising from the object side to the image side:
 a first lens component of a position meniscus lens element, convex to the object side;
 a second lens component of a bi-concave lens element;
 a third lens component of bi-convex lens element, and
 a fourth lens component of a negative meniscus lens element, concave to tee object side, wherein the object side surface of the fourth lens component is aspheric whereby its radius of curvature decreases in accordance with an increase of distance from the optical axis of the lens system, while all of the other surfaces excepting for the object side surface of the fourth lens component are spheric, and wherein the lens system fulfills the following conditions:

$1.10f < -f_4 < 1.35f$ $1.0f < -r_6 < 1.28f$ $0.088f < d_1 < 0.11f$ $1.78 < Nd_3 < 1.81$ wherein,
 $f_4$ represents the focal length of the fourth lens component;
 $r_6$ represents the radius of curvature of the image side surface of the third lens component;
 $d_1$ represents the axial thickness of the first lens component;
 $Nd_3$ represents the refractive index of the third lens component; and
 f represents the focal length of the whole lens system.

6. A photographic lens system, comprising from the object side to the image side:
 a first lens component of a positive meniscus lens element convex to the object side;
 a second lens component of a bi-concave lens element;
 a third lens component of a bi-convex lens element; and
 a fourth lens component of a negative meniscus lens element concave to the object side; wherein the object side surface of the fourth lens component is aspheric whose radius of curvature decrease in accordance with the increase of the height from the optical axis of the lens system, while all of the other surfaces excepting for the object side surface of the fourth lens component are spheric, and wherein the lens fulfills the following conditions:

$0.22 < f_3/f_{12} < 0.29$ $1.10f < -f_4 < 1.35f$ $0.71f < r_4 < 0.90f$ $1.0f < -r_6 < 1.35f$ $0.088f < d_1 < 0.11f$ $0.033f < d_3 < 0.050f$ $1.68f < Nd_1 < 1.75$ $1.78 < Nd_3 < 1.81$ $r_5 = |r_6|$ wherein,
 $f_3$ represents the focal length of the third lens component;
 $f_{12}$ repeesents the compound focal length of the first and second lens components;
 $f_4$ represents the focal length of the fourth lens component;
 $r_4$ represents the radius of curvature of the image side surface of the second lens component;
 $r_5$ represents the radius of curvature of the object side surface of the third lens component;
 $r_6$ represents the radius of curvature of the image side surface of the third lens component;
 $d_1$ represents the axial thickness of the first lens component;
 $d_3$ represents the axial thickness of the third lens component;
 $Nd_1$ represents the refractive index of the first lens component;
 $Nd_3$ represents the refractive index of the third lens component; and
 f represents the focal length of the whole lens system.

* * * * *